Sept. 12, 1961 R. T. BAUGH 2,999,581
ENDLESS TRACK ASSEMBLY
Original Filed Aug. 15, 1956 2 Sheets-Sheet 1

Inventor
Robert T. Baugh
by Richard R Mybeck
Attorney

Sept. 12, 1961 R. T. BAUGH 2,999,581
ENDLESS TRACK ASSEMBLY
Original Filed Aug. 15, 1956 2 Sheets-Sheet 2

Inventor
Robert T. Baugh
by Richard R. Mybeck
Attorney

United States Patent Office 2,999,581
Patented Sept. 12, 1961

2,999,581
ENDLESS TRACK ASSEMBLY
Robert T. Baugh, Brookfield, Wis., assignor to Allis-Chalmers Manufacturing Company, Milwaukee, Wis.
Original application Aug. 15, 1956, Ser. No. 604,223, now Patent No. 2,959,364, dated Nov. 8, 1960. Divided and this application Mar. 10, 1958, Ser. No. 720,252
2 Claims. (Cl. 198—165)

This invention relates generally to improvements in the art pertaining to endless tracks and more particularly to an improved movable endless load bearing track assembly including means for supporting such tracks so that they can be subjected to intense bearing forces without any impairment of mobility.

This application has been divided from my copending application with Richard F. Anderson and Dimitri B. Kececioglu, Serial No. 604,223, filed August 15, 1956, titled "Comminution Apparatus," now United States Letters Patent No. 2,959,364.

Essential the present invention provides a unique combination of elements and members into means for supporting and maintaining operative rolling tracks of the endless belt type when these tracks are subjected to intense bearing forces. Such forces are imposed upon the track in a number of applications such as when they are in combination with comminution apparatus of the type described in my aforesaid copending application, when they are used as high capacity load conveyers, or when they are in combination with tank housings, crane housings and other crawler driven vehicles and the like.

Devices have heretofore been proposed in an attempt to provide adequate support for and insure the mobility of load bearing endless tracks but none has obtained the total succes desired. For example, one of the proposed devices comprised an endless track and a thick rectangular plate disposed immediately behind the bearing surface of the track. In operation, however, the forces directed against the track drove it firmly against the plate and created a friction resistance which greatly impaired the mobility of and, indeed, substantially halted the movement of the track.

Another proposed device comprised an endless track reeved over a plurality of spaced cylinders extending transversely of the path of track movement. The cylinders were pivotally mounted to a housing member and rotated with the frame. While somewhat successful in reducing the friction resistance, which was a problem of former devices, this device, by the very manner in which it overcame the friction, created a new and an even more serious problem. Overloading and breaking of parts were common with this device because, except for those portions of the track passing against the various cylinders, the track chains were forced to endure most of the load in tension with the result that they were frequently broken.

According to the present invention an endless track assembly is provided which eliminates the high friction resistance and chain overloading which rendered the prior art assemblies disadvantageous and undesirable. The endless track assembly of the present invention includes support means in which forces placed upon an endless bearing track are readily dispersed and transmitted therefrom through an idler roller belt and a supporting shoe to a machine housing in such a manner that the mobility of a loaded track is substantially equal to that of an unloaded track. More particularly, support means of the type described are provided including a frame mounted supporting shoe, having in its preferred form a contoured surface substantially parallel to the operative contour of the endless track, and an endless idler roller belt which is disposed in an idler raceway defined by and disposed intermediate of the supporting shoe and the endless bearing track. The endless idler roller belt resides in intimate antifriction engagement with the supporting shoe and the endless track and is characterized by its ability to maintain the mobility of the track relative to the shoe while simultaneously dissipating the bearing forces applied to the track and comprises in its preferred form a plurality of individually mounted chain linked pivotable rollers for free and independent engaging substantially frictionless movement with opposing surfaces of the track and shoe.

Accordingly it is a prime object of the present invention to provide a support means for a moving endless track which enables friction resistance between the track and the means to be reduced to an operationally insignificant value while simultaneously enabling the track to endure greater loads and forces than heretofore possible without overloading or mechanical failure.

Another object of the present invention is to provide support means for moving endless tracks in which the cooperative coaction of its several elements and members permits the use of such tracks under force conditions which heretofore they were unable to endure.

A still further object of the present invention is to provide support means for moving endless load bearing tracks in which forces are dissipated by and transmitted from the bearing surface of a track to a supporting shoe by an endless freely moving idler roller belt interposed between the track and the shoe in an idler raceway defined therebetween.

These and other objects as will appear are fulfilled by the present invention in a manner which can be readily discerned from the following detailed description when read in conjunction with the accompanying drawing.

Figure 1:
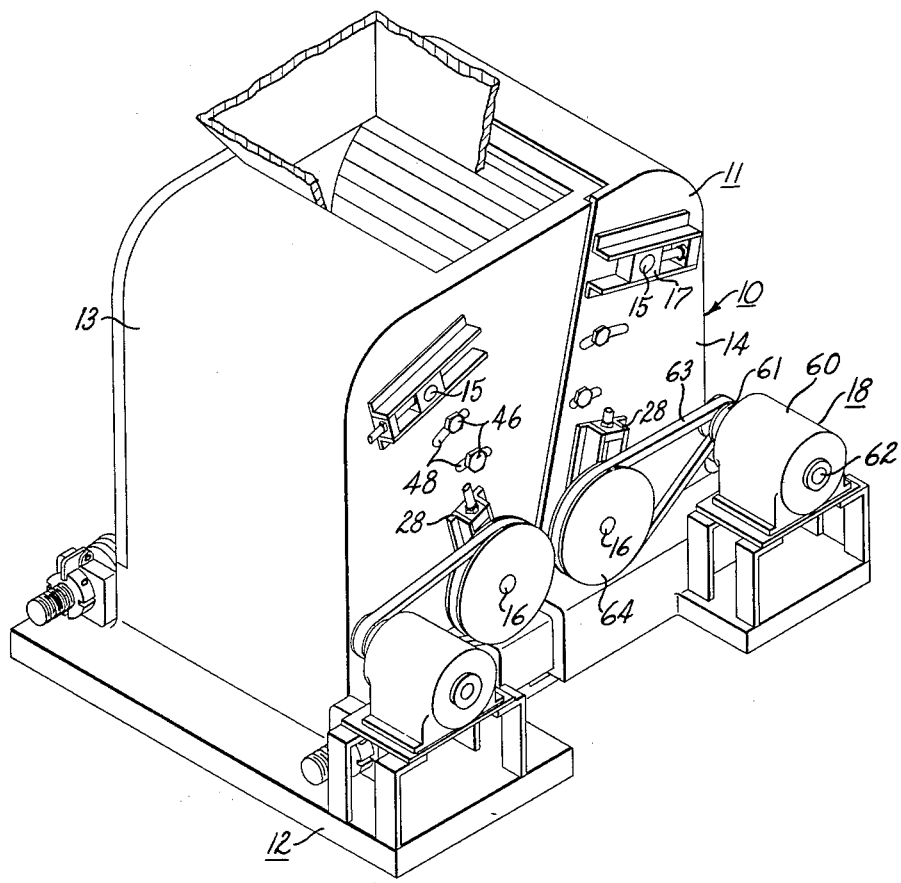
FIG. 1 is an isometric view of a typical combination embodying the support means of the present invention.

In the accompanying drawing (see FIG. 1) comminution apparatus, such as that described in my copending application, has been chosen to illustrate an operative combination embodying the present invention.

The comminution apparatus, indicated generally at 10, comprises essentially a housing 11 and a base 12. Housing 11 is preferably formed in two sections, such as end portions 13, 14, which are retractable relative to each other for reasons not germane to this instant discussion.

Each of the end portions 13, 14 contain an assembly embodying the present invention and therefore, for the purpose of describing my preferred embodiment, reference to either of the end portions may be considered equally applicable to both. Further, to enhance the clarity of the drawing, certain of the details have been shown relative to the assembly in end portion 13 while others have been shown relative to end portion 14. To maintain the relationship of the various parts with a minimum of confusion, the corresponding parts of the two assemblies will each bear the same reference numeral, the only factor to be remembered is that the assembly in end portion 13 is the mirror image of the assembly in end portion 14.

An assembly according to the present invention comprises (relative to the drawing) an upper shaft 15 and a lower shaft 16, each extending transversely of the sides of the end portion in substantially parallel spaced relationship to each other and each being rotatably mounted relative thereto in suitable bearings 17. At least one of the shafts, e.g., shaft 16, is mechanically coupled to a suitable motor assembly 18 and is driven in response thereto.

Figure 3:
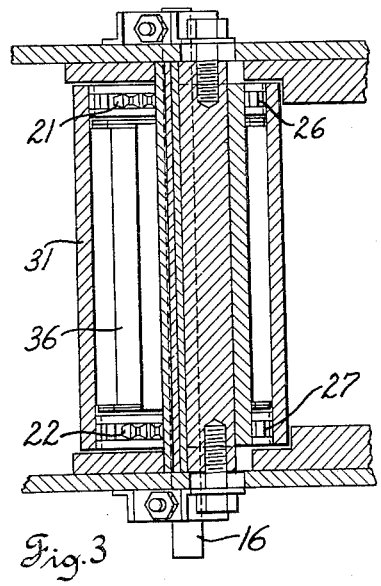
FIG. 3 is a partial view in section taken along line III—III of FIG. 2.

Each shaft, for example shaft 16 as shown in FIG. 3, has a pair of sprocket wheels 21, 22 mounted thereon in integral relationship thereto. One sprocket wheel 21 is mounted adjacent one end of shaft 16 while the other, wheel 22, is mounted adjacent the other end of shaft 16. Similar sprocket wheels 23 and 24 are similarly mounted adjacent the respective ends of shaft 15. The several sprocket wheels are secured to their respective shafts in any suitable manner such as with keys 25 (see FIG. 4).

A chain 26 is reeved vertically (relative to the drawing) about sprocket wheels 21 and 23 which, as described, are positioned adjacent a common side of the end portion while another chain 27 is reeved vertically about sprocket wheels 22 and 24, the corresponding wheel on shaft 15. Again, both of these wheels, as described, are similarly positioned adjacent the other common side of the end portion. Thus as chains 26 and 27 circumscribe and coact with their respective sprocket wheels, a direct mechanical linkage is provided between shaft 15 and shaft 16.

The relative distance between shafts 15, 16 and hence, the tension in chains 26, 27 is adjustable with suitable take up bearings 28 (shown in FIG. 1) operatively associated with and including journal bearings 17 of shaft 16.

Figure 4:
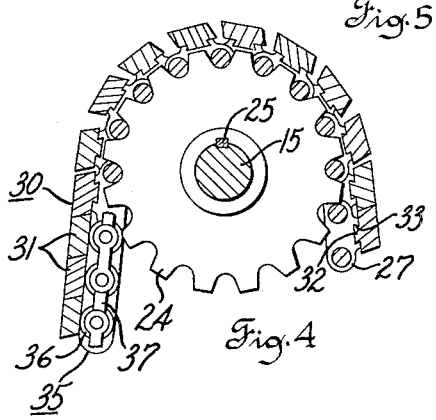
FIG. 4 is an enlarged view partially in section, with parts broken away for clarity, showing an endless load bearing track and an idler roller chain reeved over a shaft mounted sprocket wheel in accordance with one embodiment of the present invention.

In the illustrative embodiment (see FIG. 2), an endless load bearing track 30 is mounted in end portion 14 and comprises a plurality of treads 31 which may be mounted upon chains 26, 27 in any suitable manner such as by sliding tread flange 32 into chain link 33 as in FIG. 4.

Mounted operatively adjacent endless load bearing track 30 (or "track" as it shall be called) is an endless idler belt 35 which circumscribes shafts 15, 16 and is bounded laterally by chains 26, 27. Idler belt 35 comprises a plurality of rotatably mounted rollers 36 connected at their ends by linking means 37 which flexibly secure each roller in substantially parallel spaced relationship to each adjacent roller as is particularly shown in FIG. 4. Thus treads 31, when mounted in chains 26, 27 to define track 30, circumscribe the idler belt 35 and ride thereupon. Idler belt 35 provides antifriction means whereby treads 31 may ride easily across an adjustable supporting assembly 40 which will hereafter be more fully described.

Idler belt 35 provides antifriction means by its particular characteristic of being intermittently movable with track 30 while each individual roller 36 continuously rotates upon its rotatable mounting, i.e., linking means 37. It thus becomes apparent that the antifrictional characteristic of the rotatably mounted rollers greatly reduces the friction which would otherwise exist if track 30 were operatively dragged directly against the substantially rigid surface of the adjustable supporting assembly 40 disposed adjacent thereto. Linking means 37, which are disposed on each end of roller 36, define the side boundaries of idler belt 35 and are restrained laterally by chains 26, 27.

Idler belt 35 further enables the forces placed upon the bearing surface of the endless track 30 to be readily transferred from the treads 31 to the adjustable supporting assembly 40 and hence to the housing 11. The load is more uniformly distributed and therefore more easily transferred because of the uniform ladderlike arrangement which idler belt 35 presents track 30 for receiving the loads placed upon the track. The extended area provided by idler belt 35 diminishes unit loads by further distributing random point loads in more or less "snowshoe" fashion.

As previously mentioned, the assembly of the present invention further comprises an adjustable supporting assembly 40 operatively disposed between opposed runs of idler belt 35 intermediate the sides of the end portion, e.g., end portion 14. Assembly 40 comprises a supporting shoe 42 and a shoe mounting plate 44. Supporting shoe 42 is positioned adjacent that portion of idler belt 35 which is adjacent the bearing surface of track 30 in such a manner that idler belt 35 is literally sandwiched between track 30 and supporting shoe 42. Thus the forces created upon the bearing surface of track 30 and transferred to idler belt 35 are further transferred to supporting shoe 42.

Supporting shoe 42 may be rigidly secured to shoe mounting plate 44 by any suitable means such as by bolts or rivets (not shown). Supporting shoe 42, when in assembled position is thus interposed between idler belt 35 and shoe mounting plate 44, and the complete assembly is disposed generally transversely of the sides of the end portion.

The unique coaction between the bearing surface of the endless track 30 and supporting shoe 42 gives rise to further advantages the extent of which have not been completely explored even at this date. During operation the general contour of the load bearing surface of track 30 will be that of supporting shoe 42 since the forces imposed upon the track 30 force the track 30 and idler belt 35 into intimate conformity with the face contour of supporting shoe 42. Thus depending upon the application in which the assembly of the present invention is to be used, the contour of the supporting shoe 42 may be changed so that the most efficient contour for the job can be readily utilized in the present invention merely by the selection of a supporting shoe having the desired contour. For most applications, it is believed that a shoe having a slightly arcuate convex face contour defined by a constant radius of curvature will provide quite satisfactory results.

In one embodiment of the present invention, mounting plate 44 is adjustably mounted to housing 11 by suitable fasteners 46 which extend through suitable openings 48 defined in the housing sides into locking engagement in suitable fastener receiving means 50 provided in each end of and defined by mounting plate 44 generally normal to the planes described by the sides of the end portion. Thus mounting plate 44 may be rigidly and detachably secured to housing 11.

Openings 48 may be defined in the housing sides so that they are substantially arcuate as shown in the drawing to provide adjustability to mounting plate 44 and shoe 42 with respect to the peculiar characteristics of the combination in which it is assembled. Where adjustability is not an operating factor, these openings, as well as other openings which have been or will be herein defined for adjustment purposes, can be defined in terms of a single position and circular openings will be satisfactory.

Mounting plate 44 further comprises a depending portion 52 having an orifice 54 defined therethrough for receiving and circumscribing a portion of shaft 16. Depending portion 52 assists in reinforcing supporting shoe 42 and hence track 30 by providing a greater mass adjacent shaft 16 which aids in the transmission of forces imposed in that area. Depending portion 52 further cooperates with track 30 by guiding idler belt 35 as it passes from one of its runs to the other. In applications not requiring special reinforcement adjacent one end of the bearing surface of track 30, it is permissible to remove considerable mass from depending portion 52.

Figure 2:
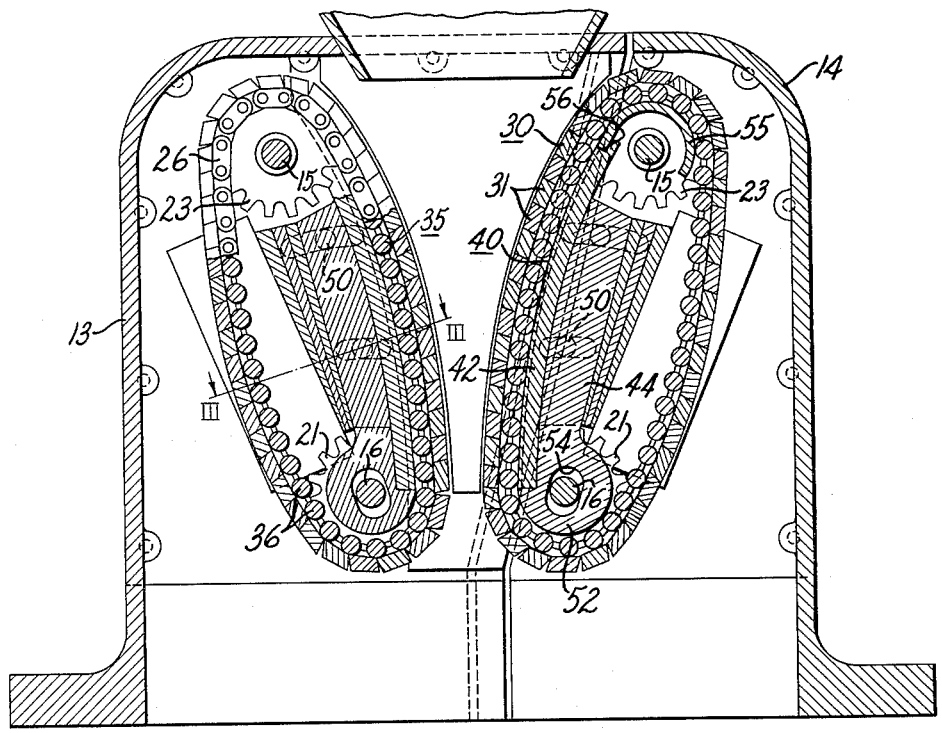
FIG. 2 is a side elevation partially in cross section of the apparatus in FIG. 1 showing in greater detail the support means of the present invention.
Figure 5:
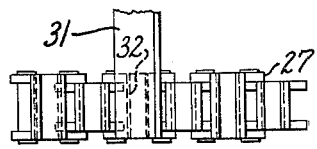
FIG. 5 is a plan view with parts broken away for clarity showing the relationship of the track bearing plate and the idler belt of FIG. 4.

Supporting assembly 40 further comprises an idler belt guide plate 55 (this member is shown in FIG. 2 with respect to end portion 14) which maintains the idler belt 35 in spaced relationship to the driven or idler shaft 15 and routes the upper transverse portion of the idler belt 35 in its change of linear direction during rotation. As particularly shown in FIG. 2, guide plate 55 is arcuate and is disposed more or less concentrically of and partially circumscribes shaft 15. One end of guide plate 55 is secured to the uppermost end of the supporting shoe 42 by any suitable means such as by weldments 56.

Mechanical movement of the endless load bearing track 30 is provided by actuating the power source 18 and transferring its movement to shaft 16 through the mechanical coupling described before.

A typical power source 18 may comprise a motor 60 having a sheave 61 mounted on its power shaft 62 and coupled by a V-belt 63 to a second sheave 64 mounted upon shaft 16. The radii of the sheaves 61, 64 may be varied to attain a desired mechanical ratio therebetween or, if desired, motor 60 may be connected directly to shaft 16 and the coupling assembly eliminated.

In operation of the present invention, the firmness of the bearing surface presented by track 30 is controlled by the tension of chains 26, 27, and more basically, by the relative displacement between the axis of rotation of shafts 15, 16. Thus the tension in track 30 and more specifically that in the chains 26, 27 can be set to any desired amount by manipulating the corresponding take up bearings 28 in the well known manner.

When such adjustments as may be desired have been made, the endless track assembly of the present invention is ready to operate and high load forces may now be applied to the load bearing surface of the track. The resulting forces, as explained, are then transmitted through the treads 31, to and through idler rollers 36 and hence to and through supporting shoe 42 and mounting plate 44 to housing 11.

Having thus described the structure of an apparatus embodying the present invention and its operation, it is understood that the apparatus is so described only to exemplify the invention and not to limit it. Such modifications as may readily occur to one skilled in the art are intended to be included with the spirit of this invention, the present invention being limited only by the scope of the appended claims.

What is claimed is:

1. In a combination comprising: a frame; a pair of vertically spaced substantially parallel rotatable shafts mounted in said frame for rotation relative thereto; sprocket wheels journaled upon each of said shafts at the outer extremities thereof adjacent and within said frame to provide a first and second pair of wheels respectively adjacent each side of said frame; a pair of endless chains mounted for movement with one another, one of said chains being reeved about said first pair of wheels and the other of said chains being reeved about said second pair of wheels; a plurality of tread plates connecting corresponding portions of said chains and cooperating therewith to define a substantially continuous bearing surface for movement with said chains; a convexly contoured support means mounted to said frame intermediate said shafts for holding said bearing surface to a convex contour during loading thereof and for receiving the forces of loading from said bearing surface and solely and directly transferring said forces to said frame without loading said shafts; and antifriction load transmission means interposed between said bearing and said support means in circumscribing relationship to said support means, said support means comprising: a mounting plate having a body portion secured to said frame intermediate opposed runs of said bearing surface and a depending portion, said depending portion having an elongated bore defined therethrough and disposed in spaced circumscribing relationship about the lowermost of said shafts, said body portion having a force receiving surface in facing relationship to the working portion of said bearing surface, a support shoe mounted to said force receiving surface intermediate said surface and said antifriction load transmission means and extending upwardly beyond said surface to an end, and arcuate guide means secured to said end and extending upwardly therefrom into spaced shielding relationship about the uppermost of said shafts.

2. An assembly for supporting a movable endless track for receiving intense loading without impairing the movability thereof, comprising: a frame; a pair of vertically spaced substantially parallel shafts mounted in said frame for rotation relative thereto; track carriers journaled upon each of said shafts adjacent and within said frame; a movable endless track being reeved about said shafts upon said track carriers and movable therewith relative to said frame; support means mounted to said frame intermediate opposed runs of said movable endless track and receiving forces from said track during the loading thereof and transferring said forces to said frame, said support means including a mounting plate having a body portion secured to said frame and a bulbous depending portion, said depending portion having an elongated bore defined therethrough circumscribing a major portion of the lowermost of said shafts in spaced relationship thereto and a shoulder portion, said body portion having a force receiving surface in facing relationship to the working portion of said endless track, a support shoe mounted to said force receiving surface of said body portion and seated upon said shoulder portion intermediate said surface and said endless track and extending upwardly beyond said surface to an end having seating means defined thereupon, and arcuate guide means carried by said end in said seating means and extending upwardly therefrom into spaced shielding, semicircumscribing relationship about the uppermost of said shafts; and antifriction load transmission means interposed between said endless track, and the adjacent surface of said supporting shoe, said guide means and the outer surface of said depending portion of said mounting plate, for reducing friction therebetween to maintain movable said endless track while intense loading is applied thereto whereby said forces of loading from said track are transmitted solely and directly through said supporting shoe and said mounting plate to said frame.

References Cited in the file of this patent

UNITED STATES PATENTS

| | | |
|---|---|---|
| 966,493 | Volk | Aug. 9, 1910 |
| 1,659,733 | Harbeck | Feb. 21, 1928 |
| 1,699,764 | Solem | Jan. 22, 1929 |
| 2,150,984 | Near et al. | Mar. 21, 1939 |
| 2,186,776 | Webb et al. | Jan. 9, 1940 |
| 2,761,633 | Sindzinski | Sept. 4, 1956 |